United States Patent
Alloul et al.

[19]

[11] Patent Number: 6,144,363
[45] Date of Patent: *Nov. 7, 2000

[54] MESSAGE STATUS DISPLAY

[75] Inventors: Albert Alloul, Montreal; Allan Brown, St. Hubert, both of Canada

[73] Assignee: Video Road Digital Inc., Quebec, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,049

[22] Filed: Dec. 16, 1996

[51] Int. Cl.$^7$ .................................................. G09G 5/00
[52] U.S. Cl. .............................. 345/117; 345/1; 345/961; 340/825.36
[58] Field of Search .............................. 345/1, 3, 23, 24, 345/117, 211, 903, 905, 961; 340/825.36, 825.44, 825.49, 815; D14/106, 114.1, 114.3, 114.4, 113

[56] References Cited

U.S. PATENT DOCUMENTS

| | | | |
|---|---|---|---|
| 4,837,798 | 6/1989 | Cohen et al. | 379/88 |
| 4,853,952 | 8/1989 | Jachmann et al. | 379/88 |
| 5,003,577 | 3/1991 | Ertz et al. | 379/89 |
| 5,224,156 | 6/1993 | Fuller et al. | 379/100.08 |
| 5,287,199 | 2/1994 | Zoccolillo | 358/402 |
| 5,333,266 | 7/1994 | Boaz et al. | 395/200.36 |
| 5,355,279 | 10/1994 | Lee et al. | 345/905 X |
| 5,434,907 | 7/1995 | Hurst et al. | 379/88 |
| 5,461,665 | 10/1995 | Shur et al. | 379/67 |
| 5,467,474 | 11/1995 | Ackerman et al. | 705/22 |
| 5,469,500 | 11/1995 | Satter et al. | 379/201 |
| 5,471,470 | 11/1995 | Sharma et al. | 370/271 |
| 5,473,692 | 12/1995 | Davis | 380/25 |
| 5,530,740 | 6/1996 | Irribarren et al. | 379/89 |
| 5,561,703 | 10/1996 | Arledge et al. | 455/31.2 |
| 5,561,709 | 10/1996 | Remillard | 379/89 |
| 5,568,536 | 10/1996 | Tiller et al. | 455/577 |
| 5,568,540 | 10/1996 | Greco et al. | 379/89 |
| 5,572,250 | 11/1996 | Lipton et al. | 348/43 |
| 5,579,472 | 11/1996 | Keyworth, II et al. | 345/326 |
| 5,699,104 | 12/1997 | Yoshinobu | 348/5.5 |
| 5,727,047 | 3/1998 | Bentley et al. | 379/93 |
| 5,751,965 | 5/1998 | Mayo et al. | 395/200.54 |
| 5,802,146 | 9/1998 | Dulman | 379/34 |
| 5,805,166 | 9/1998 | Hall, Jr. et al. | 345/349 |

OTHER PUBLICATIONS

IBM Technical Disclosure bulletin, Mail–waiting Icon for PC–based office system, IBM corp, pp. 173–174, Nov. 1989.

Primary Examiner—Steven J. Saras
Assistant Examiner—Amr Awad
Attorney, Agent, or Firm—James Angelhart; Swabey, Ogilvy, Renault

[57] ABSTRACT

An external module mountable to a user device such as a computer monitor displays the status of received messages from a number of message receiving systems without requiring integration of the message receiving systems. Three or more indicators are provided in a substantially continuous strip and a state of the indicators indicates a status of incoming messages received corresponding to each of the message receiving systems. An interface software module may be used to check the creation of new files in directories for incoming messages used by each of the message receiving means to obtain the data concerning receipt of incoming messages. A dongle may be used to connect the display to a computer without taking up an output port.

4 Claims, 5 Drawing Sheets

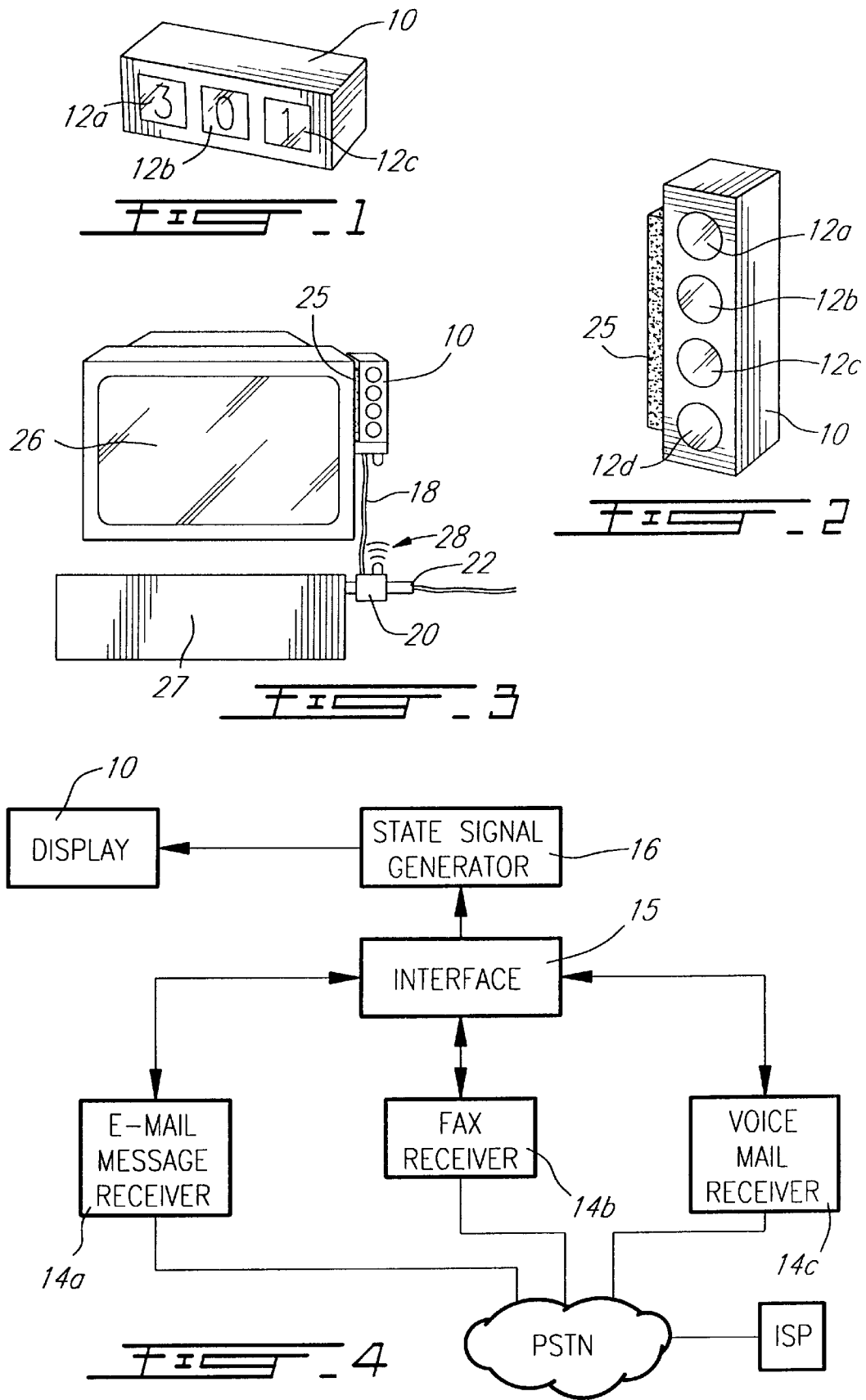

MESSAGE STATUS DISPLAY

FIELD OF THE INVENTION

The present invention relates to a message status display for displaying a status of incoming messages received at a plurality of message receiving devices. The invention relates further to a system providing an interface between a plurality of message receiving devices and a message status display unit.

BACKGROUND OF INVENTION

Modern technology has accelerated the pace of communication and consequently increased the importance of being aware of the receipt of incoming electronic messages so as to permit a prompt reply. The most common form of electronic messaging in today's office environment is voice mail, facsimile transmissions and e-mail. It is becoming more common to use a single personal computer for receiving all of these forms of incoming messages. In the home office environment, this is typically accomplished by a stand alone personal computer, whereas in a larger office environment, internal networks may be used to relay these types of messages from a central message receiver to the recipient at his or her personal computer connected to the network.

The receipt of voice, fax and e-mail messages is typically handled by different software packages. Many types of voice mail, fax modem and e-mail receiving systems have some form of alerting means to signal the computer user that an incoming message has been received. On the other hand, some such message receiving systems requires a user to check if any messages have been received without any form of automatic notification.

It has been found that the known systems for providing a message status display do not provide a convenient integrated display which shows the status of incoming messages received at a number of different message receiving systems. It is also not known to provide an easy-to-view message status display device which can be positioned by the user for viewing in a convenient location.

SUMMARY OF THE INVENTION

It is an object of the present invention to provide a message status display which provides an integrated display for a plurality of message receiving systems which will be convenient and easy to use.

It is a further object of the present invention to provide a message status display system in which different message receiving systems can be used independently of one another with the message status display system interfacing between each of the message receiving systems to provide a single display state signal for the message status display.

It is yet a further object of the present invention to provide a message status display module which can be mounted to a user device such as a computer, computer peripheral, computer monitor, telephone or the like so that a quick glance at the message status display in the convenient location by the user provides the essential information concerning incoming message status without needing to activate or use the computer or other user device.

Accordingly, there is provided a message status display system comprising: means for interfacing with a plurality of message receiving means to obtain data concerning receipt of incoming messages; means for reading the data and generating a display state signal; and display means receiving the display state signal for displaying a status of the incoming messages received at the plurality of message receiving means.

The invention further provides a message status display module comprising: display means for receiving a display state signal and displaying a status of incoming messages received at a plurality of message receiving means; a housing supporting the display means; mounting means for mounting the housing to a user device for viewing by a user; and connection means for transmitting the display state signal from a user device to the display means.

The invention also provides a message status display system comprising: at least three message receiving means each receiving incoming messages and generating data concerning receipt of incoming messages; and a like number of indicators arranged in a substantially continuous strip, the indicators being connected to the message receiving means for displaying a status of incoming messages received at message receiving means, a state of the indicators indicating a status of incoming messages received by each of the plurality of message receiving means.

BRIEF DESCRIPTION OF THE DRAWINGS

The invention will be better understood by way of the following detailed description of a preferred embodiment of the invention with reference to the appended drawings in which:

FIG. 1 is a front perspective view of a message status display module having three luminous indicators in a landscape strip according to the preferred embodiment;

FIG. 2 shows a front perspective view of a message status display module according to the preferred embodiment having four luminous indicators arranged in a vertical portrait format;

FIG. 3 illustrates the module shown in FIG. 2 attached to a side of a computer monitor illustrating also the connection between the module and a dongle (also known as and interchangeable with WEDGE) plugged into a personal computer;

FIG. 4 is a schematic block diagram of the message status display system according to the preferred embodiment;

DETAILED DESCRIPTION OF THE PREFERRED EMBODIMENT

Figure 5:
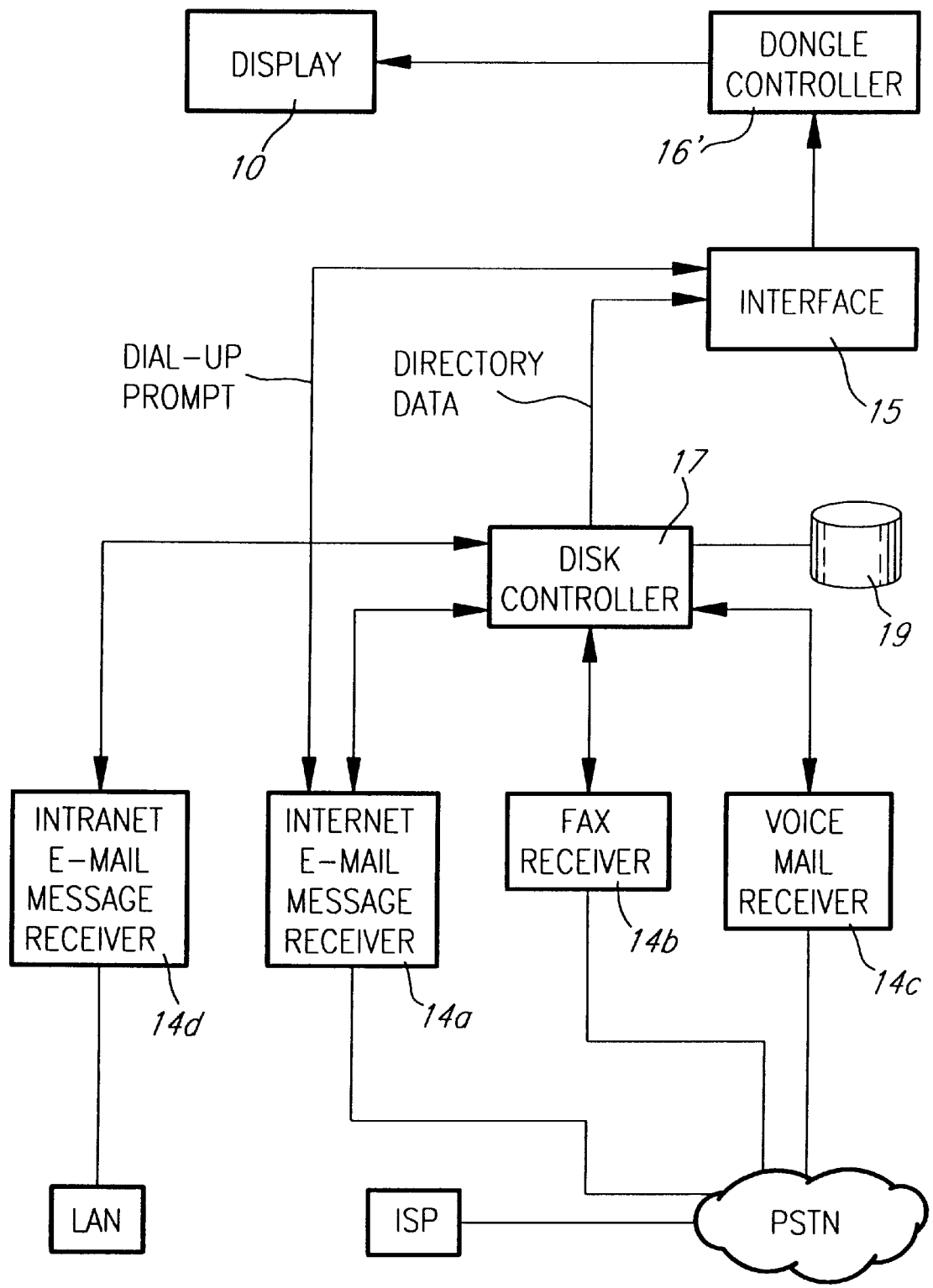
FIG. 5 illustrates a more detailed schematic block diagram of the preferred embodiment.

In the preferred embodiment, as shown in FIGS. 1, 2 and 3, the message status display system has an external display module 10 having three or four luminous indicators 12 of contrasting color for indicating the status of incoming messages received by each of a like plurality of message receiving systems. The indicators 12a, b and c are colored red, yellow and green while the fourth indicator 12d, shown in FIG. 2, is blue. In the preferred embodiment, the indicators 12 comprise LED's mounted in the housing 10 with lenses of the appropriate shape to provide an easy-to-see indicator as shown.

The display module 10 in the preferred embodiment receives a display state signal from a single connection to control software provided in a computer. As shown in FIG. 3, the display module 10 is mounted to an upper side of a computer monitor 26 using an adhesive pad 25 acting as a mounting means. The display state signal is communicated by either a thin wire connection 18 or by a wireless connection such as an infrared transmitter receiver pair 28.

In the preferred embodiment, the display state signal is transmitted from the computer 27 by using a dongle 20 so as to interfere as little as possible with existing hardware and software in the computer 27. The dongle 20 may be plugged into any suitable communications port such as the printer port, the keyboard port and, as is known in the art, the dongle normally passes data through to the connector 22 and in the reverse direction from the cable 22 into computer 27 in a completely transparent fashion except when a special code not normally used with the device connected to cable 22 is sent and is subsequently intercepted by the dongle 20. This special code includes the display state signal which the dongle then uses to turn ON and OFF the appropriate luminous indicators 12. In the case that a wire connection 18 is used, the dongle 20 may provide the necessary power to the LED's in the luminous indicators 12, and in the case that a wireless connection is provided, the display module 10 may be battery powered.

As shown in the system block diagram of FIG. 4, in the preferred embodiment there is provided a single interface software 15 which interfaces with each of the various message receiving systems or software modules in order to determine whether new incoming messages have been received. A message state signal generator or driver 16 is provided for sending the appropriate display state signal to the display device 10. As can be appreciated, the single interface 15 coordinates with the various message receiving systems to obtain the required data to generate the display state signal for the combined integrated display relieving the user of the task of having to interface with the various message receiving systems such as the e-mail, fax and voice mail receiving systems 14a, b and c illustrated in FIG. 4.

FIG. 5 illustrates a more detailed version of the system block diagram of FIG. 4 in which the interface 15 checks the presence of new message data files in a disk directory of the computer for each appropriate directory for Internet e-mail, internal Internet e-mail, faxes and voice mail. In FIG. 5, the message status display state signal generator is identified more specifically as the dongle controller 16'. With references to FIGS. 8 and 9, the installation and operation of the interface software module 15 will be described.

Figure 8:
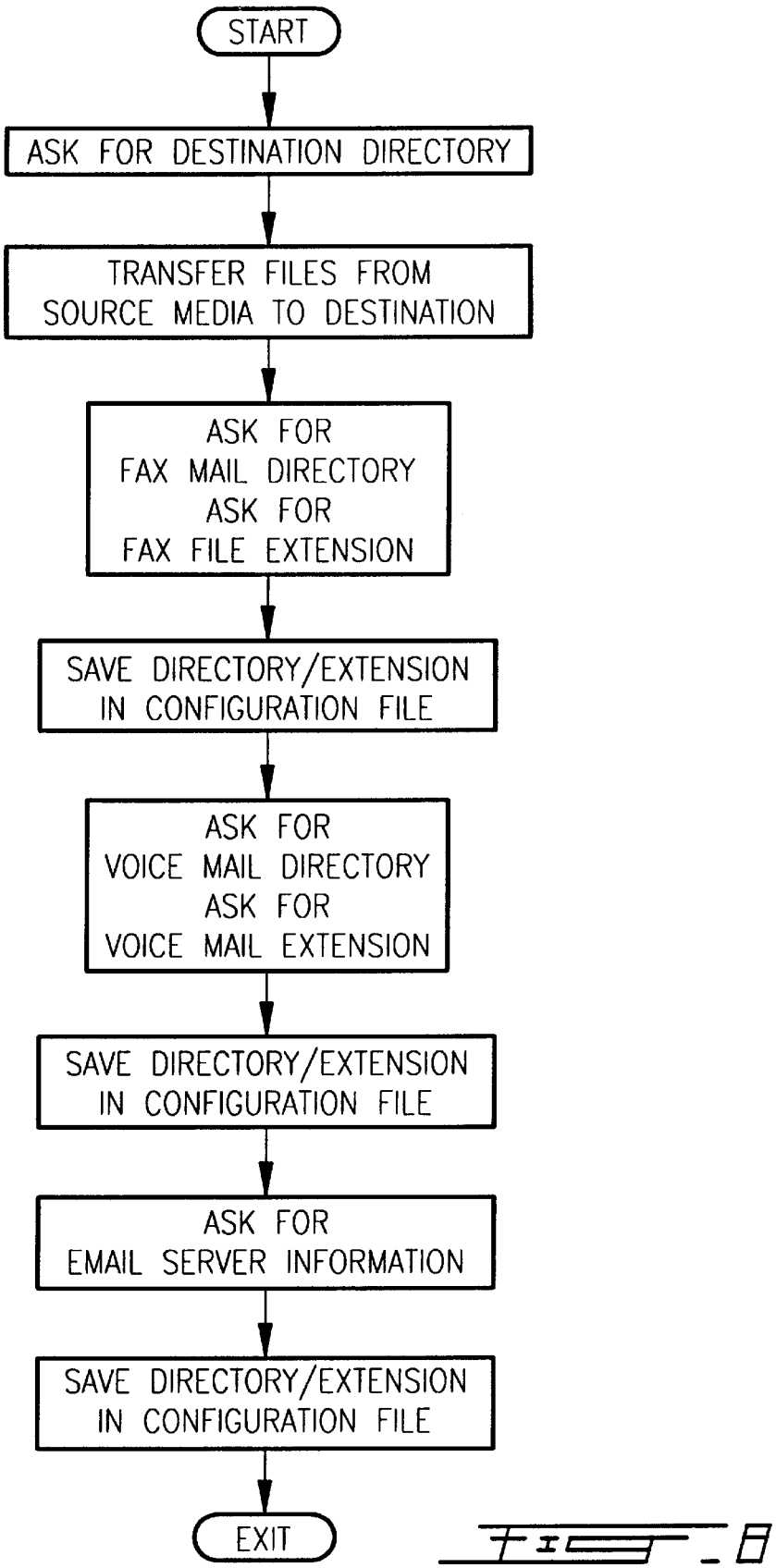
FIG. 8 illustrates a flow chart of an initialization and installation program.

During the installation process illustrated in FIG. 8, the interface software is loaded into computer 27 with the user providing information concerning the disk directories for fax and voice mail. With respect to e-mail, two options are offered. In the case that the e-mail message receiver software carries out automatic checking of e-mail messages received, the interface 15 is provided by the user with the location of the directory where new messages will be placed and the interface checks for the appearance of new files in the e-mail incoming message directory. In the case that the e-mail message receiver software does not automatically check for incoming e-mail messages, the interface 15 may be configured to run the e-mail software to carry out a check of incoming e-mail messages according to a predetermined schedule.

It can be appreciated that checking for the presence of files in a directory in which existing software places incoming messages is a convenient way to obtain data concerning receipt of incoming messages. Of course, a variety of different ways are possible for interfacing with the message receiving means to obtain data concerning receipt of incoming messages.

Figure 9:
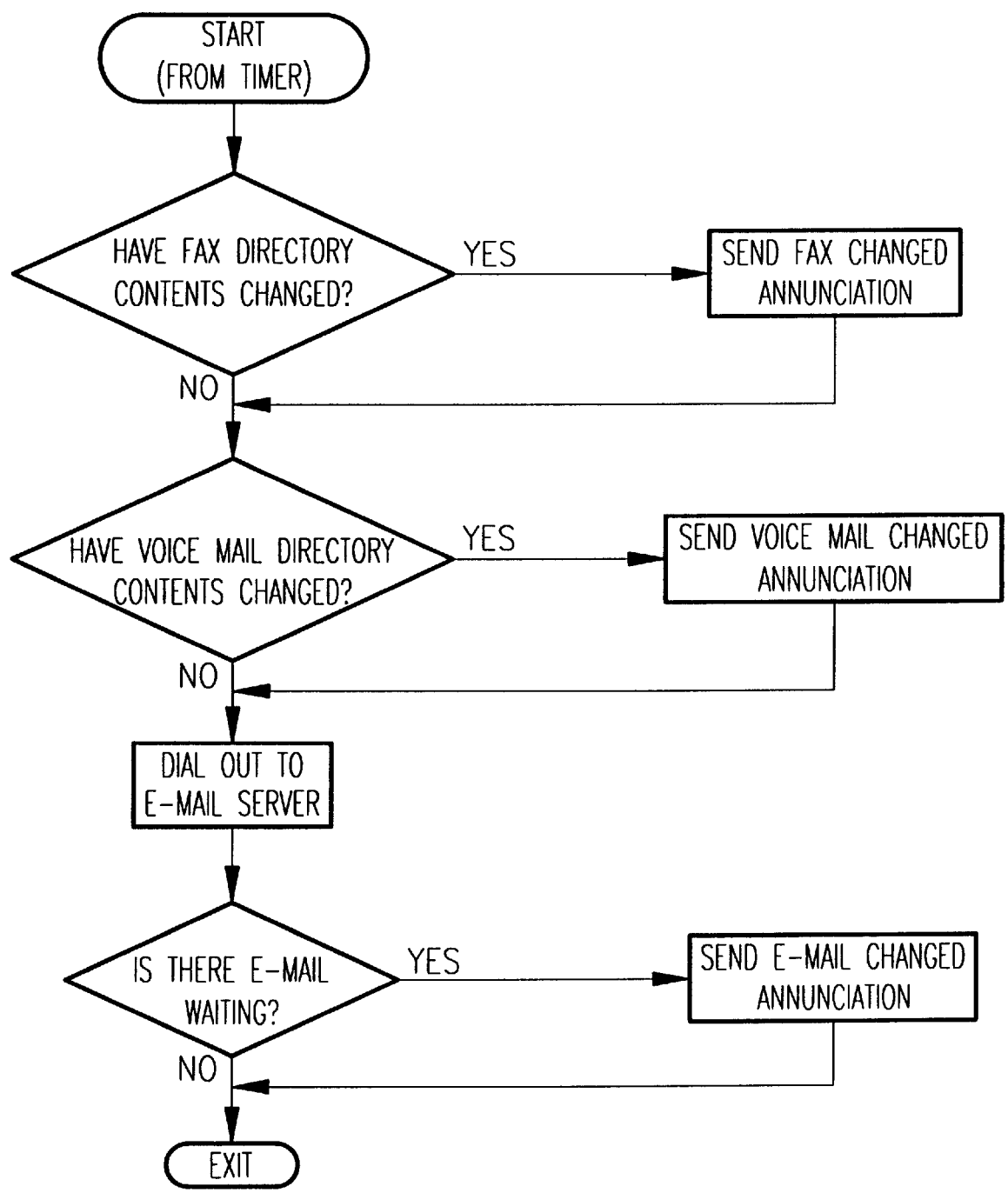
FIG. 9 illustrates the basic flow of the interface means according to the preferred embodiment.

As illustrated in FIG. 9, the interface 15 according to the preferred embodiment checks for the creation of new files in the directory for faxes and voice messages. Typically, these files also have a specific file type, such as *.FAX for fax messages. If there is a new file in either of these directories, this information is passed on to the state signal generator 16. For checking the e-mail, there is an optional step of dialing out to an e-mail server such as would be found at an Internet Service Provider (ISP). This could be carried out either by signaling e-mail software in the computer to carry out this task or by including a simplified version of e-mail software in the interface 15 to carry out the task of dialing out to the e-mail server and checking the e-mail. In the case of direct checking, the information concerning received messages would be known to the interface 15 itself, however, if a separate software package is used, the directory contents of the directory in which e-mail is received is checked in order to generate the appropriate data signal to the state signal generator 16, if need be.

In the preferred embodiment, the luminous indicators 12 are turned ON when a message has been received and turned OFF when there are no new messages. When multiple messages have been received, the luminous indicators 12 are flashed the number of times corresponding to the number of messages received in cycles. In between cycles, the luminous indicators are kept ON if a message has been received for a rest period and preferably the flashing of the indicators is carried out sequentially so that the user can count the flashing of a single indicator without being confused by the flashing of other indicators. Alternatively, a numeric display may be included, either of the digital LED type or a liquid crystal display overlay as is illustrated in FIG. 1. As can be seen, the number of messages received by each message receiving means corresponding to each of the luminous indicators is presented in a numeric format.

Figure 6:
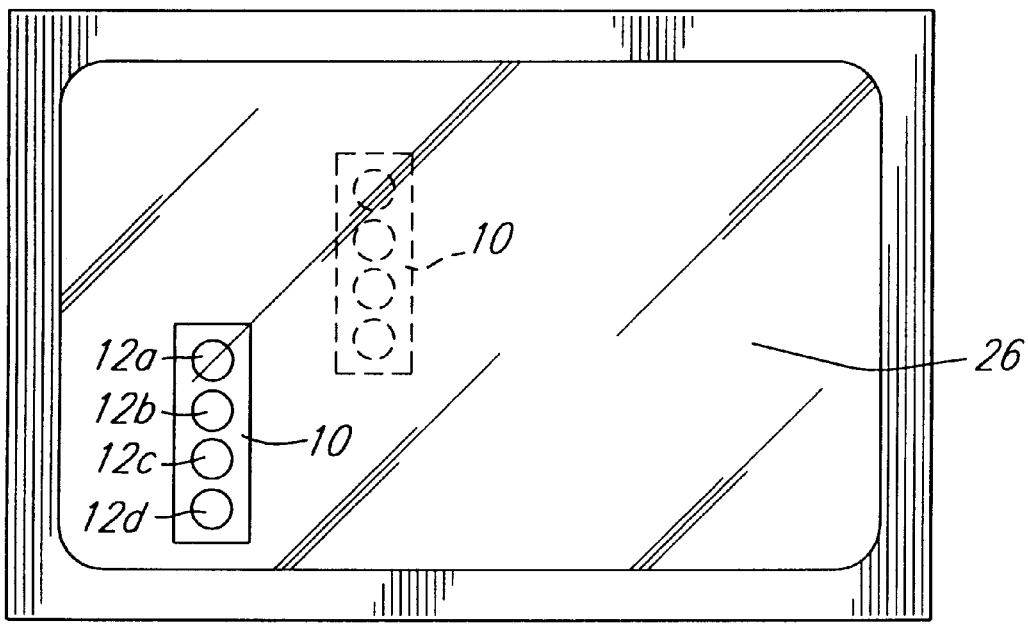
FIG. 6 illustrates a screen saver display comprising the message status display represented as a moving screen image.

In the embodiment of FIG. 6, the display 10 is not an external module but rather a computer generated image appearing on screen 26. The display 10 may be made to appear on the computer screen whenever there is a change in message status when the computer is in normal use, however, when the computer is not in normal use, the display 10 may be integrated into a screen saver image. As shown in FIG. 6, the screen saver image, including the image of display 10, may be mobile on the computer screen 26.

Figure 7:
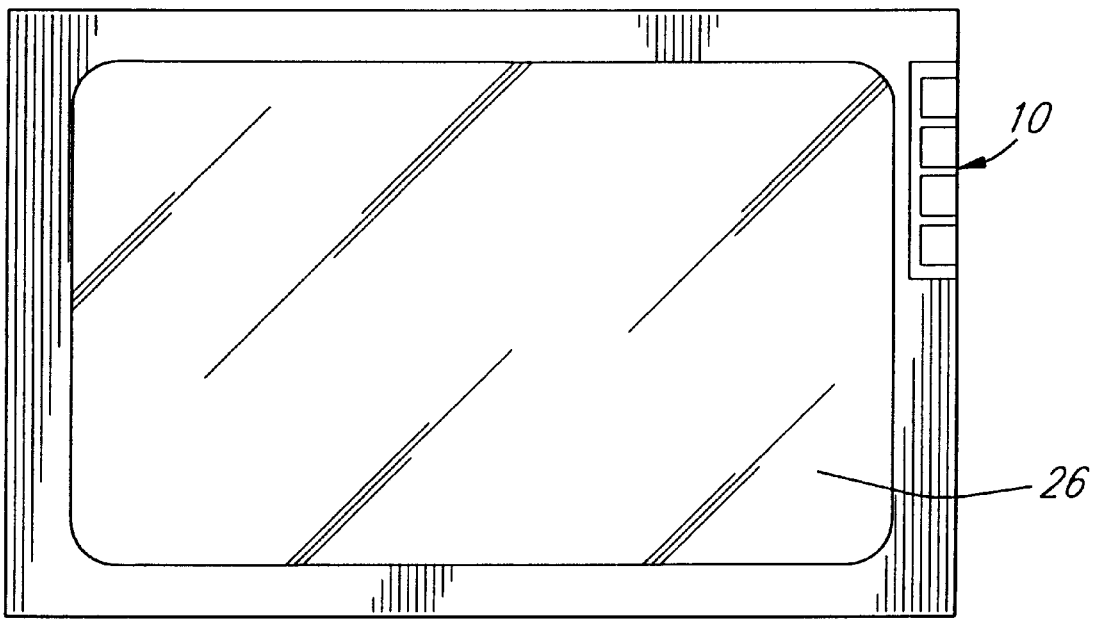
FIG. 7 illustrates the message status display of the invention incorporated into a frame of a computer monitor.

In the embodiment of FIG. 7, the display 10 is integrated into the housing of the computer screen 26 at an upper side edge thereof. Even if the computer monitor screen 26 is turned OFF, the display 10 can remain active to display the status of incoming messages. As can be appreciated, if the screen 26 is a notebook computer screen, the display 10 could be arranged to rotate about its lengthwise axis in order to face towards the rear such that when the screen is pivoted to close over the keyboard of the notebook computer, the display remains visible on the outside.

The interface 15 in the preferred embodiment can receive the command input from the computer user in order to reset the state of the display means once the new incoming messages have been acknowledged. Alternatively, a reset button could be provided on the display module 10 or associated with the display 10 integrated on the monitor 26 as is the case in FIG. 7 for resetting the display.

As will also be appreciated, it is possible that a number of e-mail address accounts be made accessible to the user device, e.g. via the same dial-up service, and the interface 15 may be configured to assign two or more of the indicators to receipt of e-mail in different e-mail address accounts. This may be of particular use with shared computers, as is the case in the home.

Other arrangements and configurations of the present invention will be apparent to those skilled in the art without departing from the spirit and the scope of the invention as defined in the appended claims.

What is claimed is:

1. A message status display system comprising:
    means for interfacing with a plurality of message receiving means to obtain data concerning receipt of incoming messages;
    means for reading said data and generating a display state signal; and
    display means receiving said display state signal for displaying a status of said incoming messages received at a plurality of message receiving means wherein said display means is located externally of a screen monitor;
    and further comprising
        a housing supporting said display means;
        mounting means for mounting said housing to said screen monitor; and
        connection means for transmitting said display state signal from a user device to said display means.

2. The message status display system as claimed in claim 1, wherein said display means receive said state display signal by means of a dongle device connected to a port of a computer.

3. The message status display system as claimed in claim 2, wherein said dongle device transmits said display state signal to said external module by wireless means.

4. The message status display system as claimed in claim 1, wherein said display means includes at least three luminous indicators arranged in a substantially continuous strip, and an illumination state of said luminous indicators indicate a status of incoming messages received corresponding to each of said plurality of message receiving means.

* * * * *